United States Patent
Nguyen et al.

(10) Patent No.: US 7,931,084 B2
(45) Date of Patent: Apr. 26, 2011

(54) METHODS FOR TREATING A SUBTERRANEAN FORMATION BY INTRODUCING A TREATMENT FLUID CONTAINING A PROPPANT AND A SWELLABLE PARTICULATE AND SUBSEQUENTLY DEGRADING THE SWELLABLE PARTICULATE

(75) Inventors: Philip D. Nguyen, Duncan, OK (US); Julio E. Vasquez, Norman, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 28 days.

(21) Appl. No.: 12/287,786

(22) Filed: Oct. 14, 2008

(65) Prior Publication Data

US 2010/0089581 A1 Apr. 15, 2010

(51) Int. Cl.
*E21B 43/267* (2006.01)
(52) U.S. Cl. ............ 166/280.1; 166/278; 166/279; 166/300
(58) Field of Classification Search ............ None
See application file for complete search history.

(56) References Cited

U.S. PATENT DOCUMENTS

| 6,169,058 | B1 | 1/2001 | Le et al. | |
|---|---|---|---|---|
| 7,044,220 | B2 | 5/2006 | Nguyen et al. | 166/280.2 |
| 2004/0094300 | A1 | 5/2004 | Sullivan et al. | |
| 2008/0108524 | A1* | 5/2008 | Willberg et al. | 507/225 |
| 2008/0142222 | A1* | 6/2008 | Howard et al. | 166/295 |
| 2008/0261834 | A1* | 10/2008 | Simon | 507/221 |

FOREIGN PATENT DOCUMENTS

| WO | 03/023177 A2 | 3/2003 |
|---|---|---|
| WO | 03/023177 A3 | 3/2003 |

OTHER PUBLICATIONS

International Search Report; PCT/GB2009/002438, mailed Jan. 21, 2010.

* cited by examiner

*Primary Examiner* — Zakiya W. Bates
(74) *Attorney, Agent, or Firm* — Robert A. Kent; Booth Albanesi Schroeder LLC

(57) ABSTRACT

A method is provided for treating at least a portion of a subterranean formation. The method includes the steps of: (a) introducing a treatment fluid into the subterranean formation, wherein the treatment fluid comprises a proppant and a swellable particulate; (b) swelling the swellable particulate, wherein the step of swelling is performed prior to, during, or after the step of introducing the treatment fluid; and (c) degrading the swellable particulate in the subterranean formation, wherein the step of degrading is performed after the steps of introducing and swelling.

25 Claims, No Drawings

METHODS FOR TREATING A SUBTERRANEAN FORMATION BY INTRODUCING A TREATMENT FLUID CONTAINING A PROPPANT AND A SWELLABLE PARTICULATE AND SUBSEQUENTLY DEGRADING THE SWELLABLE PARTICULATE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY OF THE INVENTION

Methods are provided for treating at least a portion of a subterranean formation. The methods include the steps of: (a) introducing a treatment fluid into the subterranean formation, wherein the treatment fluid comprises a proppant and a swellable particulate; (b) swelling the swellable particulate, wherein the step of swelling is performed prior to, during, or after the step of introducing the treatment fluid; and (c) degrading the swellable particulate in the subterranean formation, wherein the step of degrading is performed after the steps of introducing and swelling.

DETAILED DESCRIPTION OF THE INVENTION

Oil and gas hydrocarbons are naturally occurring in some subterranean formations. Subterranean formations that contain oil or gas are called reservoirs. The reservoirs may be located under land or off-shore.

In order to produce oil or gas, a well is drilled into a subterranean formation, which may be a reservoir or adjacent to a reservoir. As used herein, a well includes at least one wellbore drilled into the earth. As used herein, the term "wellbore" refers to the wellbore itself, including a cased portion of the well and any openhole or uncased portion of the well. Further, as used herein, "into the wellbore" means and includes directly into and through the wellbore or into and through a casing, liner, or other tubular within the wellbore; and "into the subterranean formation" means and includes when the treatment fluid enters the subterranean formation.

Various types of treatments are commonly performed on wells or subterranean formations. For example, stimulation is a type of treatment performed on a well or subterranean formation to restore or enhance the productivity of oil and gas from the well. Stimulation treatments fall into two main groups, hydraulic fracturing and matrix treatments. Fracturing treatments are performed above the fracture pressure of the subterranean formation to create or extend a highly-permeable flow path between the formation and the wellbore. Other types of treatments include, for example, controlling excessive water production and sand control.

A well or subterranean formation is normally treated with a treatment fluid. As used herein, a "treatment fluid" is a fluid used to resolve a specific condition of a wellbore or a subterranean formation. As used herein, a "treatment fluid" also means the specific composition of a fluid at the time the fluid is being introduced into a wellbore. A treatment fluid is typically adapted to be used to resolve a specific purpose, such as stimulation, isolation, or control of reservoir gas or water. The term "treatment" in the term "treatment fluid" does not necessarily imply any particular action by the fluid. As used herein a "fluid" is a continuous amorphous substance that tends to flow and to conform to the outline of its container as a liquid or a gas when tested at a temperature of 77° F. and a pressure of 1 atmosphere. In addition, it should be understood that, as used herein, a "fluid" should be pumpable when the fluid is introduced into the subterranean formation. As used herein, a "fluid" can be a slurry, which is a suspension of insoluble particles. It should be understood, of course, that a treatment fluid can include a gas for foaming the fluid.

Hydraulic Fracturing and Proppant

"Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation.

A "frac pump" is used for hydraulic fracturing. A frac pump is a high-pressure, high-volume pump. Typically, a frac pump is a positive-displacement reciprocating pump. Such a pump is capable of pumping a wide range of fluid types, including corrosive fluids and abrasive fluids. For example, a treatment fluid of a slurry containing hard, insoluble particulates such as sand is an abrasive fluid. Using a frac pump, the fracturing fluid may be pumped down into the wellbore at high rates and pressures, for example, at a flow rate in excess of 20 barrels per minute (4,200 U.S. gallons per minute) at a pressure in excess of 2,500 pounds per square inch ("psi"). The pump rate and pressure of the fracturing fluid may be even higher, for example, flow rates in excess of 100 barrels per minute and pressures in excess of 10,000 psi are not uncommon.

To fracture a subterranean formation typically requires hundreds of thousands of gallons of fracturing fluid. Further, it is often desirable to fracture at more than one downhole location. The fracturing fluid is usually water or water-based for various reasons, including the ready availability of water and the relatively low cost of water compared to other liquids. As used herein, "water-based" means that the fluid comprises greater than 50% by weight of an aqueous solution.

The formation or extension of a fracture occurs suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation is indicated by a sudden drop in fluid pressure, which can be observed at the well head.

A newly-created or extended fracture will tend to close together after the pumping of the fracturing fluid is stopped. To prevent the fracture from closing, a material must be placed in the fracture to keep the fracture propped open. A material used for this purpose is often referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. For use as a proppant, a particulate is typically selected based on the characteristics of: size range, crush strength, and insolubility.

The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand-sized, which geologically is defined as having a largest dimension ranging from 0.0625 millimeters up to 2 millimeters. (The next smaller particle-size class below sand is silt, which is defined as having a largest dimension ranging from less than 0.0625 mm down to 0.004 mm.) The next larger particle-size class above sand is gravel, which is defined as having a largest dimension ranging from greater than 2 mm up to 64 mm. In a preferred embodiment of the invention, the proppant has a particulate size distribution range such that at least 90% of the proppant has a size of 0.0625 mm to 64 mm.

The proppant is sufficiently strong, that is, has a sufficient compressive or crush resistance, to prop the fracture open without being deformed or crushed by the closure stress of the fracture in the subterranean formation. For a proppant material that crushes under closure stress, the proppant preferably has an API crush strength of at least 4,000 psi closure stress based on 10% crush fines. This performance is that of a medium strength proppant, where a very high crush strength would be 10,000 psi.

Further, a suitable proppant should not dissolve in fluids commonly encountered in a well. Preferably, a material is selected that will not dissolve more than 1 gram of proppant per 1 liter of liquid. Of course, "proppant" also does not mean or refer to dissolved solids.

Suitable proppant materials include, but are not limited to, silicon dioxide, walnut shells, sintered bauxite, glass, plastics, ceramic materials, and any combination thereof in any proportion.

Some or all of the proppant can be coated and pre-cured with a curable resin to improve proppant strength and surface characteristics such as wettability.

Some or all of the proppant can be coated with an uncured, curable resin. The uncured resin can cure in the subterranean formation to consolidate the proppant of the proppant pack to form a "proppant matrix." After curing, the resin improves the strength, clustering ability, and flow-back characteristics of the proppant matrix relative to a similar proppant pack without such a curable resin. Suitable curable resins include, but are not limited to, epoxies, furans, phenolics, furfuryl alcohols, and any combination thereof in any proportion.

A proppant matrix can also be formed by incorporating a tackifying agent into at least a portion of the proppant. The tackifying agent can be used in addition to or instead of a curable resin.

The proppant pack or proppant matrix in the fracture provides a higher-permeability flow path for the oil or gas to reach the wellbore compared to the permeability of the surrounding subterranean formation, which increases oil and gas production from the well.

The concentration of proppant in the treatment fluid is preferably in the range of from about 0.03 kilograms to about 3 kilograms of proppant added per liter of liquid phase (0.25 lb/gal-25 lb/gal).

Viscosity-Increasing Agent to Help Suspend Proppant

The proppant typically has a much higher density than water. For example, sand has a specific gravity of about 2.7. Any such proppant suspended in the water will tend to separate quickly and settle out from the water very rapidly. To help suspend the proppant in a water-based fracturing fluid, it is common to use a viscosity-increasing agent for the purpose of increasing the viscosity of water. The viscosity-increasing agent is sometimes known in the art as a "thickener."

A viscosity-increasing agent is a chemical additive that alters fluid rheological properties to increase the viscosity of the fluid. A viscosity-increasing agent can be used to increase the viscosity, which increased viscosity can be used, for example, to help suspend a proppant material in the treatment fluid.

Because of the high volume of fracturing fluid typically used in fracturing, it is desirable to increase the viscosity of fracturing fluids efficiently in proportion to the concentration of the viscosity-increasing agent. Being able to use only a small concentration of the viscosity-increasing agent requires less total amount of the viscosity-increasing agent to achieve the desired fluid viscosity in a large volume of fracturing fluid. Efficient and inexpensive viscosity-increasing agents include water-soluble polymers such as guar gum. Other types of viscosity-increasing agents, such as viscoelastic surfactants, can also be used for various reasons, for example, in high-temperature applications.

The viscosity of a solution of a given concentration of guar gum or other viscosity-increasing agent can be greatly enhanced by cross-linking the viscosity-increasing agent. One example of a cross-linking agent is boric acid. A cross-linking agent can help increase the viscosity of a fluid for a given concentration of a viscosity-increasing agent. A "base gel" is a fluid that includes a viscosity-increasing agent, such as guar, but that excludes, for example, fluids that are typically referred to as "cross-linked gels" and "surfactant gels."

Thus, one of the most important properties of a fracturing fluid is the viscosity that it has at a specific time and specific temperature during the treatment. Viscosity is the resistance of a fluid to flow, defined as the ratio of shear stress to shear rate. The unit of viscosity is Poise, equivalent to dyne-sec/$cm^2$. The unit centipoise ("cP"), which is $1/100$ Poise, is usually used with regard to well treatment fluids. Viscosity must have a stated or an understood shear rate in order to be meaningful. Measurement temperature also must be stated or understood. As used herein, if not otherwise specifically stated, the viscosity of a fluid is measured with a Fann Model 50 type viscometer at a shear rate of 40 l/s and at 25° C. (77° F.).

For reference, the viscosity of water is about 1 cP, whereas the viscosity of honey is in the range of 2,000-10,000 cP, and ketchup is in the range of about 50,000-100,000 cP. Depending on the type of pumping equipment, a fluid may be pumpable if it has a viscosity of less than 50,000 cP.

There are numerous ways of measuring and modeling viscous properties, and new developments continue to be made. A typical method for QA/QC purposes uses a couette device that measures viscosity as a function of time and temperature. Test fluids contain all of the components of the fluid including water, polymer, cross-linkers, pH control, surfactants, breakers, and other similar things, except for the proppant. Due to the geometry of most common viscosity-measuring devices, proppant interferes with the measurement, therefore, fracturing fluid viscosity is routinely measured without proppant included. If measured with a Proppant Transport Measuring Device (PTMD), which allows the measurement of the viscosity of a fluid containing a proppant, the instrument is preferably calibrated, for example, against a Fann Model 50 viscometer. Whatever the specific type, the viscosity-measuring instrument can be calibrated using standard viscosity silicone oils and fluids.

Adding Breaker, Surfactant, and Other Additives

Optionally, one or more other additives can be included to form a treatment fluid to be delivered into a wellbore for various purposes.

Fluids used in the invention also commonly include a "breaker." A breaker is a chemical used for the purpose of diminishing or "breaking" the viscosity of a fluid so that the fluid can be recovered more easily from the formation. With regard to breaking down viscosity, oxidizers, enzymes, or acids can be used, including delayed-release or encapsulated breakers. Breakers reduce the molecular weight of the viscosity-increasing agent (which may be cross-linked) by the action of an acid, an oxidizer, an enzyme, or a combination of these.

In the case of borate-crosslinked gels, increasing the pH, and, therefore, increasing the effective concentration of the active cross-linker, the borate anion, reversibly creates the borate cross-links. Lowering the pH can eliminate the borate/polymer bonds. At a high pH above 8, the borate ion exists and is available to cross-link and cause gelling. At a lower pH, the borate is tied up by hydrogen and is not available for cross-linking, thus, an increase in viscosity due to borate cross-linking is reversible.

The treatment fluid used in the invention can also include a surfactant. For example, a surfactant may be used for its ability to aid the dispersion and/or stabilization of a gas component into the fluid. Viscoelastic surfactants are also suitable for use in the treatment fluids.

Treatment fluids used in the invention can further contain other additives and chemicals that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, and the like.

It should be understood that during the course of a treatment, several different treatment fluids can be used. Some common reasons why treatment fluids of a treatment would be varied over the course of a treatment include to accommodate: changes in the concentrations of proppant desired to be carried down to the subterranean formation from initial packing of the fracture to tail-end packing; expected changes in temperature; or the longer duration that the first treatment fluid may need to maintain viscosity before breaking compared to the shorter duration that a later-introduced treatment fluid may need to maintain viscosity. These changes may be made in stepped changes of concentrations or ramped changes of concentrations. Further, certain components of the treatment fluids may be changed, for example, a catalyst or concentration of a catalyst for the breaker may be changed to control the different break times required from the first treatment fluid compared to later-introduced treatment fluids. One or more treatment fluids can be used in a treatment.

Preferred Embodiments According to Methods of the Invention

In general, methods are provided for treating at least a portion of a subterranean formation. The methods include the steps of: (a) introducing a treatment fluid into the subterranean formation, wherein the treatment fluid comprises a proppant and a swellable particulate; (b) swelling the swellable particulate, wherein the step of swelling is performed prior to, during, or after the step of introducing the treatment fluid; and (c) degrading the swellable particulate in the subterranean formation, wherein the step of degrading is performed after the steps of introducing and swelling.

The methods of the present invention can be used, for example, to enhance or stimulate oil and gas production from a well. More particularly, the methods can be used to enhance the permeability of a proppant pack or a proppant matrix formed within a fracture so that fluids from the subterranean formation may flow more freely to the wellbore.

As used herein, the words "comprise," "has," and "include" and all grammatical variations thereof are each intended to have an open, non-limiting meaning that does not exclude additional elements or steps.

The treatment fluid includes a proppant. The proppant should be selected to be capable of maintaining a fracture in the subterranean formation in a propped open condition based on the proppant size and crush strength. In a preferred embodiment, the proppant has a particulate size distribution range such that at least 90% of the proppant has a size of 0.0625 mm to 64 mm. Preferably, if the proppant crushes, the proppant has an API crush strength of at least 4,000 psi closure stress based on 10% crush fines. The proppant should be insoluble to the fluids typically encountered in a well environment, such as water or oil. In a preferred embodiment of the invention, the proppant is selected from the group consisting of silicon dioxide, walnut shells, sintered bauxite, glass, plastics, ceramic materials, and any combination thereof in any proportion. The proppant is not capable of swelling.

The treatment fluid includes a swellable particulate. Preferably, the coefficient of compressibility for the swelled particulate is on the same order of magnitude as that for water. Preferably, the swellable particulate is capable of swelling to at least 200% of the volume of the completely unswelled, swellable particulate. The swellable particulate is preferably capable of swelling to at least 400% of the volume of the completely unswelled, swellable particulate. Thus, the swellable particulate should be capable of swelling to a swelled form that has low compressibility. This means that the density of the swelled particulate should remain substantially constant for isothermal pressure changes, that is, the coefficient of compressibility for the swelled particulate is preferably low.

The swellable particulate is capable of swelling upon contact with a swelling agent for the swellable particulate. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion.

Preferably, the swellable particulate, when in a substantially unswelled form, has a particulate size distribution range such that at least 90% of the swellable particulate has a size of 0.01 mm to 5 mm. More preferably, the swellable particulate, in a substantially unswelled form, has a particulate size distribution range such that at least 90% of the swellable particulate has a size of 0.2 mm to 1 mm. As used herein, the term "substantially unswelled" means that the swellable particulate is not swelled to more than 10% of its swelling capability.

Preferably, the swellable particulate, when in a substantially swelled form, is selected to have a size and shape similar to the size and shape of the proppant. It is preferable that the proppant and the swellable particulate do not segregate within the treatment fluid but remain dispersed. Preferably, the physical shape of the swellable particulate, especially when in a substantially swelled form, should be chosen so as to enhance the desired shape and relative composition of the resultant voids within a proppant pack or proppant matrix. For example, a rod-like particle shape may be suitable in applications wherein channel-like voids in the proppant matrix are desired. As used herein, the term "substantially swelled" means that the swellable particulate is swelled to at least 50% of its swelling capability.

The swellable particulate is capable of being degraded. Preferably, the swellable particulate is capable of being degraded sufficiently such that, after being degraded, the majority of the swellable particulate can flow with a fluid, as a fluid, or dissolved in another fluid out of the proppant pack or proppant matrix. In a preferred embodiment, the swellable particulate is capable of being degraded to become soluble in water. It should be understood that, in certain embodiments of the invention, the swellable particulate can be capable of being degraded to become soluble in another dissolving fluid for the degraded swellable particulate, such as oil.

Preferably, the swellable particulate is capable of being degraded upon contact with a degrading agent for the swellable particulate, whereas, the proppant is not capable of being degraded upon contact with such a degrading agent. The degrading agent can be any agent that degrades the swellable particulate. The degrading agent preferably degrades the swellable particulate by chemically breaking the organic material of the particulate. Examples of suitable degrading agents include, but are not limited to, acids, sodium perborate, sodium hypochlorite, strong oxidizers, and any combination of the aforementioned, in any combination. In each embodiment of the invention, the swellable particulate, the swelling agent, and the degrading agent should be selected to operatively cooperate according to the methods of the invention.

In choosing a swellable particulate for use according to the methods of the invention, consideration should be given to the degradation products that would result. The degrading agent and expected degradation products should not adversely affect productivity of the well. The choice of the swellable particulate also can depend, at least in part, on the conditions of the well and subterranean formation, for example, temperature. The swellable particulate should be stable in the well environment, including temperature, until it is desired to be degraded.

Preferably, the swellable particulate is an organic material. More preferably, the swellable particulate is a polymeric material or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack or matrix with desired permeability while maintaining adequate propping and filtering capability.

Preferably, the concentration of the proppant is present in the treatment fluid in the range of 0.1-25 lb/gallon, and most preferable 1 to 8 lb/gallon. Preferably, the swellable particulate is present in the treatment fluid in an amount of about 0.1% to 50% by weight of the proppant. According to an advantage of the present invention, the swellable particulate can be present in the treatment fluid in an amount of about 30% to 50% by weight of the proppant. After subsequently being degraded, such a high concentration of the swellable particulate can provide very high permeability to a proppant pack or proppant matrix.

The treatment fluid can include the swellable particulate in a substantially unswelled form, in which case the treatment fluid also preferably further includes the swelling agent for the swellable particulate. The treatment fluid can include the swellable particulate in a substantially pre-swelled form without a swelling agent.

In some preferred embodiments according to the invention, the treatment fluid further includes a degrading agent for the swellable particulate. When the treatment fluid includes the degrading agent, the degrading agent preferably does not degrade the swellable particulate until after a proppant pack or a proppant matrix with the swellable particulate has been formed. For example, the degrading agent can be slow acting or in a time-delayed release capsule.

The treatment fluid can further include a viscosity-increasing agent. Preferably, the treatment fluid further comprises a breaker to break the viscosity of the treatment fluid. In some embodiments, the breaker is preferably in a time-delayed form such that the breaker is delayed from breaking the viscosity of the treatment fluid. As discussed above, other additives can also be included in the treatment fluid.

Preferably, the treatment fluid would be a fluid when tested at a temperature of 77° F. and a pressure of 1 atmosphere. More preferably, the viscosity of the treatment fluid is such that the treatment fluid is pumpable when introduced into the subterranean formation.

The method of treating the subterranean formation can include the step of forming the treatment fluid. For example, the treatment fluid can be pre-blended and then transported to the well site or it can be prepared on-the-fly at the well site and then introduced downhole. Preferably, the treatment fluid should have a well-dispersed mixture of the proppant and the swellable particulate in the treatment fluid.

According to some embodiments of the invention, the method further includes the step of creating or extending at least one fracture in the subterranean formation prior to the step of introducing the treatment fluid. Preferably, the particulate size distribution range of each of the proppant and of the swellable particulate when in a substantially swelled form is sufficient such that at least a portion of each of them would be expected to be able to enter the fracture.

In general, the methods of treating a subterranean formation according to the invention include the steps of: (a) introducing a treatment fluid into the subterranean formation, wherein the treatment fluid comprises a proppant and a swellable particulate; (b) swelling the swellable particulate, wherein the step of swelling is performed prior to, during, or after the step of introducing the treatment fluid; and (c) degrading the swellable particulate in the subterranean formation, wherein the step of degrading is performed after the steps of introducing and swelling.

Preferably, the treatment fluid is pumped into the subterranean formation. Depending on the viscosity at the temperature of the treatment fluid when introduced into the wellbore, the step of introducing should be at a sufficient velocity to help maintain the proppant and the swellable particulate in suspension at least until the treatment fluid is placed into a fracture in the subterranean formation.

In a preferred embodiment of the invention, the treatment fluid is introduced into the portion of the subterranean formation under conditions to form a proppant pack that includes the swellable particulate. As used herein, the term "proppant pack" means the proppant is in an unconsolidated form.

Preferably, the treatment fluid is introduced under conditions such that the swellable particulate has swelled in volume at least 25% of its swelling capability prior to the swellable particulate reaching the portion of the subterranean formation to be treated. More preferably, the treatment fluid is introduced under conditions such that the swellable particulate has swelled in volume at least 75% of its swelling capability prior to the swellable particulate reaching the portion of the subterranean formation to be treated.

In some preferred embodiments, the swellable particulate swells by absorbing a swelling agent for the swellable particulate. Accordingly, in such embodiments, the step of swelling preferably includes the step of contacting the swellable particulate with a swelling agent for the swellable particulate. Preferably, the swellable particulate is contacted with the swelling agent prior to being introduced into the subterranean formation or the swelling agent can be included with the treatment fluid. It is also contemplated, however, that the swelling agent can be introduced into the subterranean formation as a post-flush, that is, the swellable particulate is introduced into the subterranean formation in a substantially unswelled form and the swelling agent is subsequently introduced into the subterranean formation.

Preferably, the step of swelling the swellable particulate is performed prior to the step of introducing the treatment fluid so that the swellable particulate is substantially or completely swelled prior to forming a proppant pack that includes the swellable particulate.

The proppant, when deposited into the fracture of the subterranean formation, should be expected to form a proppant pack that includes the swellable particulate. If at least some of the proppant in the treatment fluid is coated with an uncured, curable resin, then in such embodiments the resin coating is preferably allowed to cure, which consolidates and binds together at least a portion of the proppant to form a proppant matrix that includes the swellable particulate. Any type of curable resin that will enable the proppant to consolidate within the formation is suitable for use in the present invention, for example, epoxies, furan, phenolics, furfuryl aldehyde, furfuryl alcohol, and any combination thereof in any proportion.

If a curable resin is utilized, the resin is preferably allowed to cure before the swellable particulate is degraded. More preferably, the resin is allowed to cure in the subterranean formation under conditions such that at least the resin-coated proppant does move within or flow out of the portion of the subterranean formation to be treated.

A tackifying agent could be used instead of, or in addition to, a curable resin. The tackifying agent, among other things, helps distribute the swellable particulate within the treatment fluid and keep it from flowing out of the proppant matrix in the subterranean formation. Using a tackifier, as opposed to a curable resin, could be especially useful if the swellable particulate chosen has a low density or specific gravity or has a substantially different particle size than the proppant.

If used, the tackifying agent is preferably, but not necessarily coated on the proppant before the proppant is mixed with the swellable particulate. In one embodiment of the present invention, the tackifying agent is coated onto the proppant early in the proppant stage of the fracturing operation and then resin-coated proppant is used during the tail-end stage of the fracturing operation. In another embodiment, the tackifying agent and the curable resin are coated on the proppant particulates intermittently.

Any suitable method can be used to consolidate the proppant pack into a matrix, including mechanical methods, for example, interlocking the proppant. In any event, to appreciate some of the beneficial effects of the present invention, the proppant should consolidate within a fracture in the formation to form a proppant matrix that includes the swellable particulate. The term "proppant matrix" as used herein means the proppant pack is consolidated.

Preferably, the step of degrading includes the step of contacting the swellable particulate with a degrading agent for the swellable particulate. The degrading agent for the swellable particulate can be introduced into the subterranean formation after the steps of introducing and swelling and after the proppant matrix has formed. A preferable result is achieved if the swellable particulate degrades slowly. A slow degradation of the swellable particulate can help to maintain the stability of the proppant matrix. An even more preferable result is obtained when the swellable particulate does not begin to degrade until after the proppant matrix has developed some compressive strength.

More preferably, the step of degrading increases the permeability of the proppant pack or proppant matrix. The permeability can be increased by uniformly distributing the swellable particulate in the proppant pack or proppant matrix as the proppant pack or matrix forms. After the requisite time period dictated by the characteristics of the particular swellable particulate utilized, the swellable particulate degrades. This degradation, in effect, causes the swellable particulate to be substantially removed from the proppant pack or proppant matrix. As a result, a plurality of inter-connected pores is created in the proppant pack or proppant matrix. These inter-connected pores increase the permeability of the proppant pack or matrix. An increased permeability in the portion of the subterranean formation to be treated increases well productivity.

More preferably, the inter-connected pores increase the permeability of the proppant pack or proppant matrix to at least 60%. In preferred embodiments, the swellable particulate should not be in a proportion to the proppant pack or proppant matrix such that, when degraded, undesirable inter-connected pores result in the proppant pack or matrix making the pack or matrix potentially ineffective in maintaining the integrity of the fracture.

According to another embodiment of the invention, the treatment fluid can include a low-density proppant and a swellable particulate. The treatment fluid can be introduced into the subterranean formation under conditions to form at least a partial monolayer with the swellable particulate. The swellable particulate can be subsequently degraded to provide a very-high permeability monolayer of the proppant.

It is to be understood that numerous modifications, alterations, subcombinations, and changes can be made in the invention without departing from the spirit and scope of the invention as set forth in the appended claims. It is the intention to cover all embodiments and forms of the invention within the allowable scope of the claims.

What is claimed is:

1. A method of treating at least a portion of a subterranean formation, the method comprising the steps of:
   a. introducing a treatment fluid into the subterranean formation, wherein the treatment fluid comprises a proppant and a swellable particulate;

b. swelling the swellable particulate, wherein the step of swelling is performed prior to, during, or after the step of introducing the treatment fluid; and c. degrading the swellable particulate in the subterranean formation, wherein the step of degrading is performed after the steps of introducing and swelling.

2. The method according to claim 1, wherein the swellable particulate is capable of being swelled to at least 200% of the volume of the completely unswelled, swellable particulate.

3. The method according to claim 1, wherein the swellable particulate is capable of swelling upon contact with a swelling agent for the swellable particulate.

4. The method according to claim 3, wherein the swelling agent is water.

5. The method according to claim 1, wherein the swellable particulate when in a substantially unswelled form has a particulate size distribution range such that at least 90% of the swellable particulate has a size of 0.01 mm to 5 mm.

6. The method according to claim 1, wherein the swellable particulate is capable of being degraded sufficiently such that, after being degraded, the majority of the swellable particulate can flow with a fluid, as a fluid, or be dissolved in another fluid out of a proppant pack or proppant matrix.

7. The method according to claim 1, wherein the swellable particulate is capable of being degraded upon contact with a degrading agent.

8. The method according to claim 1, wherein the swellable particulate comprises a polymeric material.

9. The method according to claim 8, wherein the polymeric material is selected from the group consisting of cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion.

10. The method according to claim 1, wherein the swellable particulate comprises a salt of a polymeric material.

11. The method according to claim 10, wherein the salt is selected from the group consisting of salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion.

12. The method according to claim 1, wherein the swellable particulate is present in the treatment fluid in an amount of about 0.1% to 50% by weight of the proppant.

13. The method according to claim 1, wherein the swellable particulate is present in the treatment fluid in an amount of about 30% to 50% by weight of the proppant.

14. The method according to claim 1, wherein the treatment fluid further comprises a swelling agent for the swellable particulate.

15. The method according to claim 1, wherein the treatment fluid further comprises a degrading agent for the swellable particulate.

16. The method according to claim 1, wherein the treatment fluid further comprises a viscosity-increasing agent.

17. The method according to claim 16, wherein the treatment fluid further comprises a breaker to break the viscosity of the treatment fluid.

18. The method according to claim 1, wherein the method further comprises the step of creating at least one fracture in the subterranean formation prior to the step of introducing.

19. The method according to claim 1, wherein the step of introducing comprises conditions such that the swellable particulate has swelled in volume at least 25% of its swelling capability prior to the swellable particulate reaching the portion of the subterranean formation to be treated.

20. The method according to claim 1, wherein at least a portion of the proppant is coated with an uncured, curable resin.

21. The method according to claim 20, wherein the resin is allowed to cure after the proppant has been introduced into the subterranean formation and before the swellable particulate has been degraded.

22. The method according to claim 1, wherein the step of degrading comprises introducing a degrading agent into the subterranean formation subsequent to the steps of introducing and swelling.

23. The method according to claim 1, wherein the step of degrading increases the permeability of a proppant pack or proppant matrix to at least 60%.

24. A method of treating at least a portion of a subterranean formation, the method comprising the steps of:

a. introducing a treatment fluid into the subterranean formation, wherein the treatment fluid comprises a proppant and a swellable particulate;

b. swelling the swellable particulate, wherein:
  i. the step of swelling is performed prior to, during, or after the step of introducing the treatment fluid;
  ii. the swellable particulate is capable of swelling upon contact with a swelling agent for the swellable particulate;
  iii. the swellable particulate is capable of being degraded upon contact with a degrading agent for the swellable particulate; and
  iv. the swellable particulate is capable of being degraded sufficiently such that, after being degraded, the majority of the swellable particulate can flow with a fluid, as a fluid, or dissolved in another fluid out of a proppant pack or proppant matrix; and c. degrading the swellable particulate in the subterranean formation, wherein the step of degrading is performed after the steps of introducing and swelling.

25. A method of treating at least a portion of a subterranean formation, the method comprising the steps of:

a. introducing a treatment fluid into the subterranean formation, wherein the treatment fluid comprises a proppant and a swellable particulate;

b. swelling the swellable particulate, wherein:
  i. the step of swelling is performed prior to, during, or after the step of introducing the treatment fluid;
  ii. the swellable particulate is capable of swelling upon contact with a swelling agent for the swellable particulate;
  iii. the swellable particulate is capable of being degraded upon contact with a degrading agent for the swellable particulate; and c. degrading the swellable particulate in the subterranean formation, wherein:
  i. the step of degrading is performed after the steps of introducing and swelling; and
  ii. the step of degrading increases the permeability of a proppant pack or proppant matrix to at least 60%.

* * * * *